US011115990B2

(12) United States Patent
Thomas et al.

(10) Patent No.: US 11,115,990 B2
(45) Date of Patent: Sep. 7, 2021

(54) UE AUTONOMOUS BEAM SELECTION

(71) Applicant: QUALCOMM Incorporated, San Diego, CA (US)

(72) Inventors: Sejoe Thomas, Cochin (IN); Abhijeet Prasad, San Diego, CA (US); Neelakanta Venkata Seshachalam Chimmapudi, San Diego, CA (US); Alvin Siu-Chung Ng, Hong Kong (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/779,283

(22) Filed: Jan. 31, 2020

(65) Prior Publication Data

US 2021/0243768 A1 Aug. 5, 2021

(51) Int. Cl.
*H04W 72/08* (2009.01)
*H04W 24/10* (2009.01)
(Continued)

(52) U.S. Cl.
CPC .......... *H04W 72/085* (2013.01); *H04B 7/082* (2013.01); *H04W 24/10* (2013.01);
(Continued)

(58) Field of Classification Search
CPC .......... H04W 72/085; H04W 52/0245; H04W 52/226; H04W 24/10; H04W 52/265; H04W 72/046; H04B 7/082
(Continued)

(56) References Cited

U.S. PATENT DOCUMENTS

2019/0150013 A1   5/2019   Zhang et al.
2019/0239135 A1   8/2019   Levitsky et al.
(Continued)

FOREIGN PATENT DOCUMENTS

WO   2019035631 A1   2/2019
WO   2019064270 A1   4/2019
(Continued)

OTHER PUBLICATIONS

Intel Corporation: "On Beam Management Enhancement", 3GPP TSG RAN WG1 Meeting #96, 3GPP Draft R1-1902503, 3rd Generation Partnership Project (3GPP), Mobile Competence Centre; 650, Route Des Lucioles F-06921 Sophia-Antipolis Cedex; France, Athens, Greece, Feb. 25, 2019-Mar. 1, 2019, pp. 1-13, Mar. 1, 2019 (Mar. 1, 2019), XP051600199, Chapter 5 & 6.
(Continued)

*Primary Examiner* — Eugene Yun
(74) *Attorney, Agent, or Firm* — Qualcomm Incorporated

(57) ABSTRACT

Wireless communication techniques that include autonomous beam selection performed by a mobile device are discussed. A mobile device may receive a first SSB on a current-serving reception beam and receive other SSBs on different reception beams. The mobile device may autonomously switch beams during communication without instruction from another device. A UE can adjust from one beam to another while performing wireless communication using a current-serving reception beam to performing wireless communication using a second reception beam. A switch can occur upon determining that the quality of wireless communication performed using the second reception beam on which a second SSB was received is higher than the quality of wireless communication performed using the current-serving reception beam on which the first SSB was received. Other features are also described.

16 Claims, 5 Drawing Sheets

(51) Int. Cl.
   *H04W 52/22*     (2009.01)
   *H04W 52/26*     (2009.01)
   *H04B 7/08*      (2006.01)
   *H04W 52/02*     (2009.01)
   *H04W 72/04*     (2009.01)

(52) U.S. Cl.
   CPC ..... *H04W 52/0245* (2013.01); *H04W 52/226* (2013.01); *H04W 52/265* (2013.01); *H04W 72/046* (2013.01)

(58) Field of Classification Search
   USPC ..................................................... 455/67.11
   See application file for complete search history.

(56) References Cited

U.S. PATENT DOCUMENTS

| | | |
|---|---|---|
| 2019/0268893 A1 | 8/2019 | Tsai et al. |
| 2020/0236729 A1 | 7/2020 | Ahn et al. |

FOREIGN PATENT DOCUMENTS

| | | |
|---|---|---|
| WO | WO-2019110869 A1 | 6/2019 |
| WO | 2019135654 A1 | 7/2019 |
| WO | WO-2019138081 A1 | 7/2019 |

OTHER PUBLICATIONS

International Search Report and Written Opinion—PCT/US2021/014646—ISA/EPO—dated May 6, 2021.

UE AUTONOMOUS BEAM SELECTION

TECHNICAL FIELD

Aspects of the present disclosure relate generally to wireless communication systems, and more particularly, to autonomous beam selection techniques (e.g., performed by a mobile device in a wireless communication system). Certain embodiments of the technology discussed below can enable and provide enhanced communication features and techniques for communication systems, including aiding devices to identify and/or select beams for communications, high data rates, high capacity, spectral efficiency, high reliability, wider coverage, low latency, and power-efficient device operations.

INTRODUCTION

Wireless communication networks are widely deployed to provide various communication services such as voice, video, packet data, messaging, broadcast, and the like. Wireless networks may be multiple-access networks capable of supporting multiple users by sharing available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. For example, a method can include receiving, by a UE, a first synchronization signal block (SSB) on a first reception beam (or current-serving reception beam). The method can also include receiving, by the UE, one or more SSBs on one or more reception beams. The one or more SSBs can be received on different ones of the one or more reception beams. The method may further include determining, by the UE, that a quality of wireless communication performed using another or second reception beam on which a second SSB was received is higher than a quality of wireless communication performed using the current-serving reception beam on which the first SSB was received. The second SSB may be one of the one or more SSBs. The method may also include switching, by the UE, from performing wireless communication using a current-serving reception beam to performing wireless communication using a second reception beam. Such a switch can be based on or made upon determining that a quality of wireless communication performed using the second reception beam is higher than a quality of wireless communication performed using the current-serving reception beam.

In an additional aspect of the disclosure, an apparatus configured for wireless communication is provided. For example, the apparatus can include means for receiving a first synchronization signal block (SSB) on a first reception beam (or current-serving reception beam). The apparatus can also include means for receiving one or more SSBs on one or more reception beams. The one or more SSBs can be received on different ones of the one or more reception beams. The apparatus may further include means for determining that a quality of wireless communication performed using another or second reception beam on which a second SSB was received is higher than a quality of wireless communication performed using the current-serving reception beam on which the first SSB was received. The second SSB may be one of the one or more SSBs. The apparatus can also include means for switching from performing wireless communication using a current-serving reception beam to performing wireless communication using a second reception beam. Such a switch can be based on or made upon determining that a quality of wireless communication performed using the second reception beam is higher than a quality of wireless communication performed using the current-serving reception beam.

In an additional aspect of the disclosure, a non-transitory computer-readable medium having program code recorded thereon is provided. The program code can include program code executable by a computer for causing the computer to receive a first synchronization signal block (SSB) on a first reception beam (or current-serving reception beam). The program code can also include program code executable by the computer for causing the computer to receive one or more SSBs on one or more reception beams. The one or more SSBs can be received on different ones of the one or more reception beams. The program code may further include program code executable by the computer for causing the computer to determine that a quality of wireless communication performed using another or second reception beam on which a second SSB was received is higher than a quality of wireless communication performed using the current-serving reception beam on which the first SSB was received. The second SSB may be one of the one or more SSBs. The program code can also include program code executable by the computer for causing the computer to switch from performing wireless communication using a current-serving reception beam to performing wireless communication using a second reception beam. Such a switch can be based on or made upon determining that a quality of wireless communication performed using the second reception beam is higher than a quality of wireless communication performed using the current-serving reception beam.

In an additional aspect of the disclosure, an apparatus configured for wireless communication is provided. The apparatus includes at least one processor, and a memory coupled to the processor. The at least one processor can be configured to receive a first synchronization signal block (SSB) on a first reception beam (or current-serving reception beam). The at least one processor can also be configured to receive one or more SSBs on one or more reception beams. The one or more SSBs can be received on different ones of the one or more reception beams. The at least one processor may be further configured to determine that a quality of wireless communication performed using another or second reception beam on which a second SSB was received is higher than a quality of wireless communication performed using the current-serving reception beam on which the first SSB was received. The second SSB may be one of the one or more SSBs. The at least one processor can also be configured to switch from performing wireless communication using a current-serving reception beam to performing wireless communication using a second reception beam. Such a switch can be based on or made upon determining that a quality of wireless communication performed using the second reception beam is higher than a quality of wireless communication performed using the current-serving reception beam.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
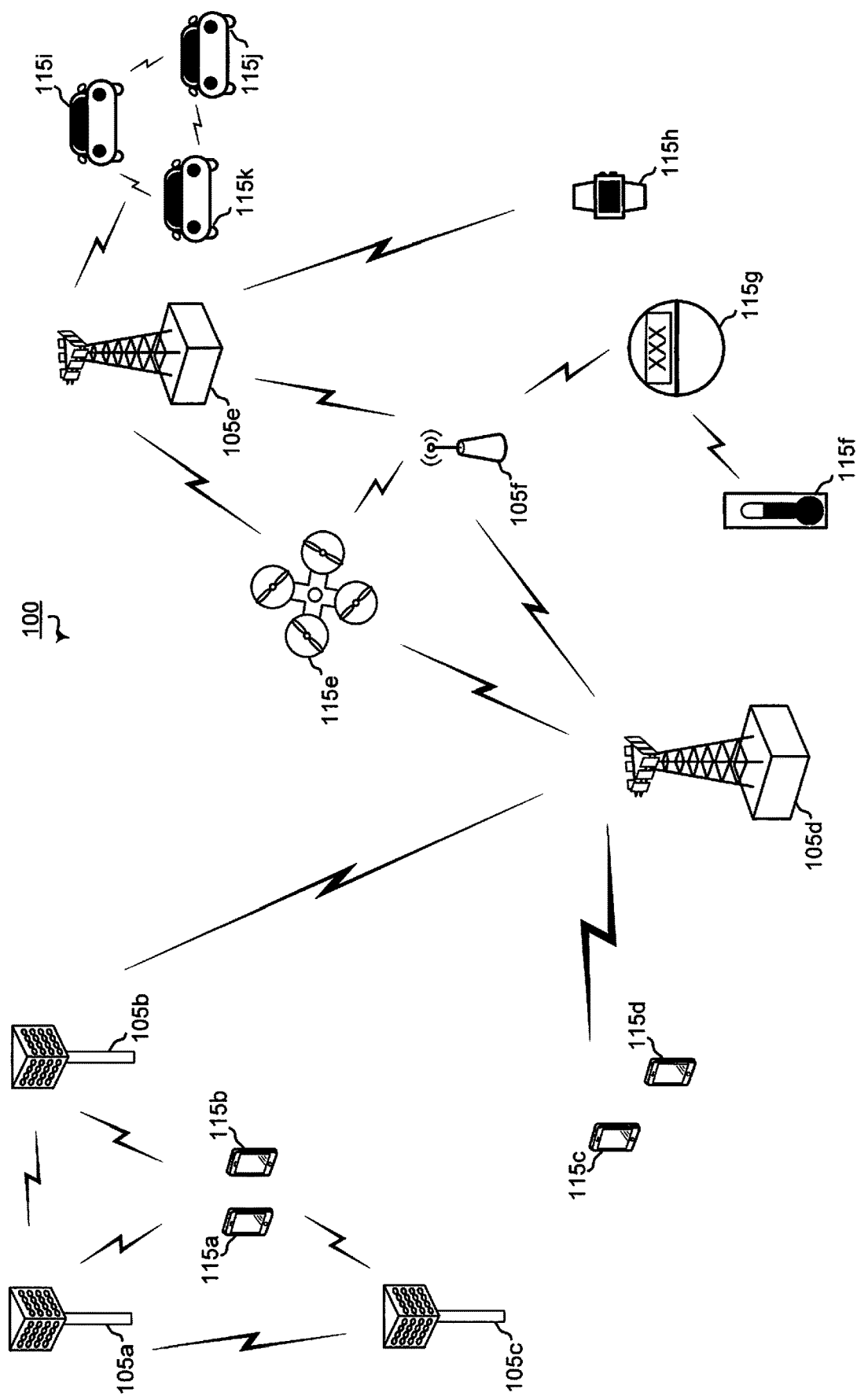
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatuses, and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations. In this fashion networks may employ varying usage of a variety of timing/frequency arrangements.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
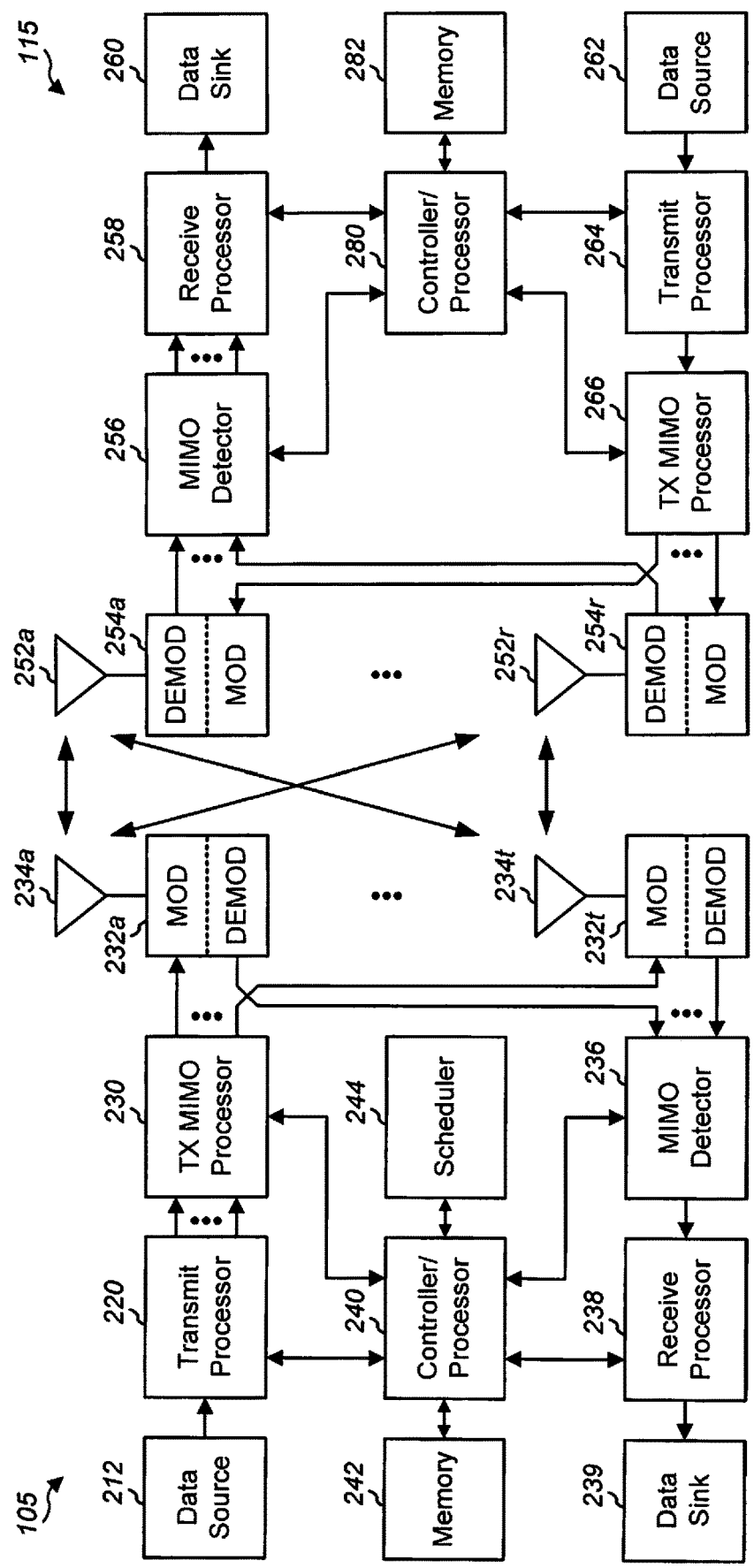
FIG. 2 is a block diagram conceptually illustrating a design of a base station/gNB and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIG. 4, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

As illustrated in FIGS. 1-2, base stations and mobile devices may each be equipped with multiple antennas to transmit and/or receive information. In some aspects of the disclosure, base stations and mobile devices may use the multiple antennas for beamforming. Beamforming may refer to the configuring of multiple antennas to form a beam through which information may more efficiently and/or effectively be transmitted and/or received.

Figure 3:
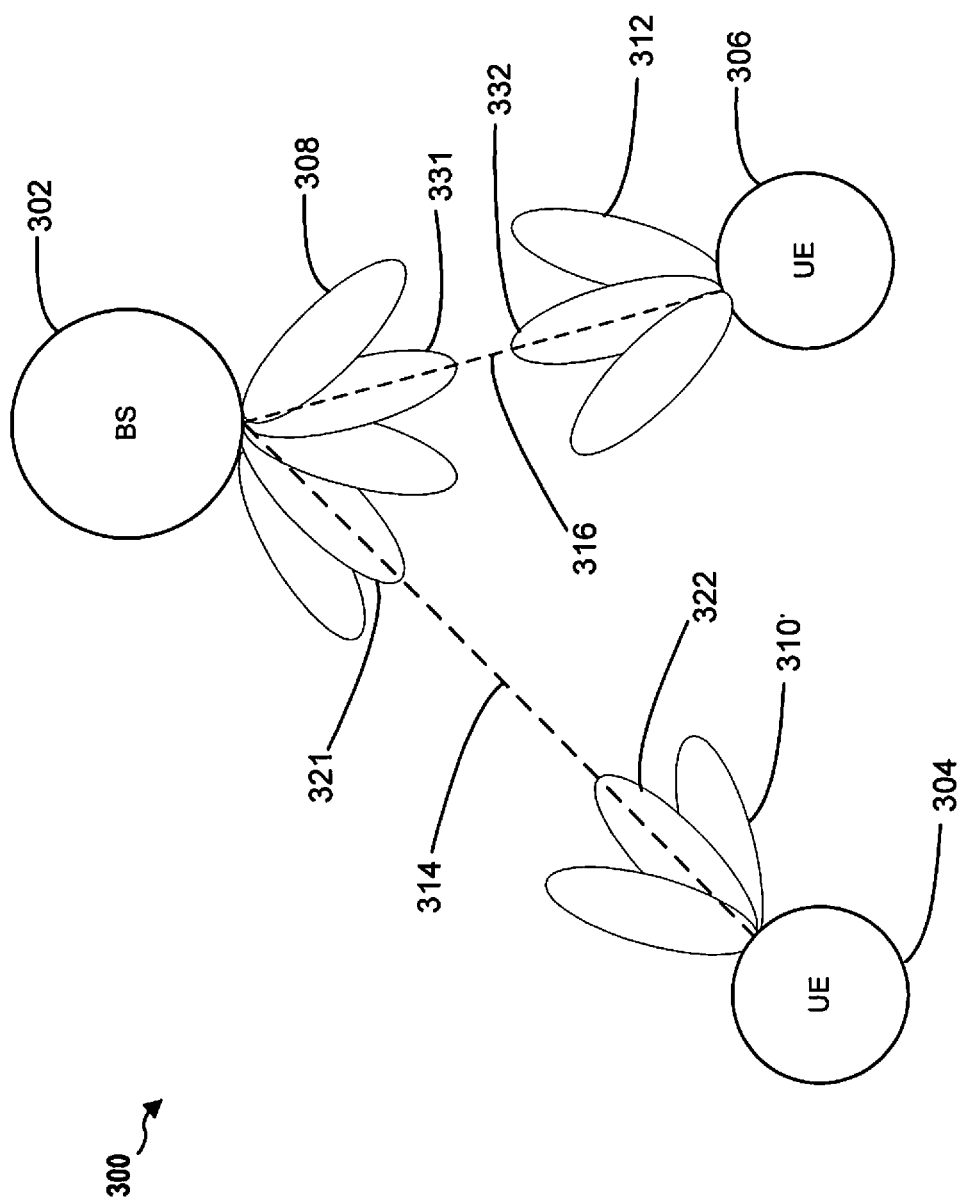
FIG. 3 is a diagram illustrating an example of wireless communication performed in a wireless communication system according to some aspects of the present disclosure.

FIG. 3 is a diagram illustrating an example of wireless communication performed in a wireless communication system according to some aspects of the present disclosure. In FIG. 3, a base station 302 communicates with a first mobile device 304 and a second mobile device 306 via different beams in different beamforming directions. As indicated by a set of beams 308, the base station 302 may communicate via any one of a plurality of directional beams. As indicated by a set of beams 310, the first mobile device 304 may communicate via any one of a plurality of directional beams. As indicated by a set of beams 312, the second mobile device 306 may communicate via any one of a plurality of directional beams. Thus, at a given point in time, the base station 302 may communicate with the first mobile device 304 via a first beam in a first beamforming direction 314 and communicate with the second mobile device 306 via a second beam in a second beamforming direction 316. As illustrated in FIG. 3, in some aspects of the disclosure, the beamforming directions from the base station 302 to first mobile device 304 and the second mobile device 306 may be distinct.

In some aspects of the present disclosure, a base station transmission beam and a corresponding mobile device reception beam may be used to establish a communication link, in this case a downlink communication link, between the base station and the mobile device. For example, one communication link illustrated in FIG. 3 may be established with BS transmission beam 321 and UE reception beam 322 associated with beamforming direction 314. Another communication link illustrated in FIG. 3 may be established with BS transmission beam 331 and UE reception beam 332 associated with beamforming direction 316. Uplink communication links may be similarly established, for example with a base station reception beam and a mobile device transmission beam.

The quality and reliability of an established communication link may change over time. For example, as a mobile device moves, the properties of the corresponding channel of the established communication link may change. As a result, the beams initially used to establish the communication link may no longer be the beams that result in an optimal communication link, e.g., a communication link meeting certain quality and reliability criteria or thresholds.

A communication link may be monitored and managed during communication operations. For example, a communication link can be used to identify an initial beam to use for wireless communication and to prevent a beam failure and/or ultimately a communication link failure. Typically, there may be two common ways of monitoring and/or managing a radio communication link: (1) synchronization signal block (SSB)-based communication link monitoring and/or management; and (2) channel state information reference signal (CSI-RS)-based communication link monitoring and/or management. Typically, a base station, e.g., a gNB, may inform a mobile device, e.g., a UE, of what type of communication link management should be used, assuming a communication link management scheme is even supported by the network gNB and/or UE. The two foregoing communication link management techniques may be used by the base station and/or mobile device to identify an initial best beam, e.g., a serving beam, that the base station and/or mobile device are to use for wireless communication. Eventually, however, as described in the previous paragraph, the initially-selected serving beam may become a worse beam than other beams available to the mobile device.

Typical options for switching a mobile device from using an initially-established, currently-serving beam to another "better" beam generally require assistance from a base station. For example, one option may include a mobile device sending a base station reports that include SSB measurements associated with a beam used for wireless communication. And the base station, after reading the reports, may instruct a mobile device to switch to a base-station-identified better beam. Yet when the base station does not support SSB-based or CSI-RS-based communication link monitoring/management, a mobile device may not switch to a better beam and may continue using a beam having low quality and/or reliability. As a result, communication link failure (radio link failure) may eventually occur.

Aspects of the present disclosure provide autonomous device beam management and/or beam switching. Beam adjustments or changes from one beam to another may occur during communication operations (e.g., due to dynamic channel conditions). Control of beam adjustments may occur at a UE or mobile device without intervention by a controlling or scheduling entity (e.g., a base station). According to some deployments, a communication device may include a mobile device autonomously. That is, for example, a mobile device or UE may change beams for communication on its own initiative and under its own control. Enabling a UE or mobile device to change beams without assistance or instruction from a network base station enables a UE to switch beams efficiently and timely.

A UE may deploy or utilize a variety of features for beam changes. Beam changes can occur during communication operations, in preparation of communication operations, or at other instances. In some deployments, beam switching can generally involve monitoring SSBs associated with available beams to use for wireless communication. Such monitoring can aid in determining whether there is a better-quality SSB and associated beam available to use for wireless communication than the initially-established, currently-serving beam. In some aspects of the disclosure, a mobile device may perform monitoring even when a network base station and/or mobile device do not support SSB-based communication link management. Additionally or alternatively, a mobile device can employ beam monitoring or switching when a network base station instructs the mobile device to use CSI-RS-based communication link management. According to some aspects of the disclosure, when a mobile device determines that a better-quality SSB and associated beam is available, the mobile device may perform contention-based RACH on that identified better SSB. In such an arrangement, a mobile device using contention-based RACH can inform a base station (e.g., a gNB) of a SSB that the UE is now using for wireless communication. This enables a base station to account for a beam update in subsequent communication with the UE.

Figure 4:
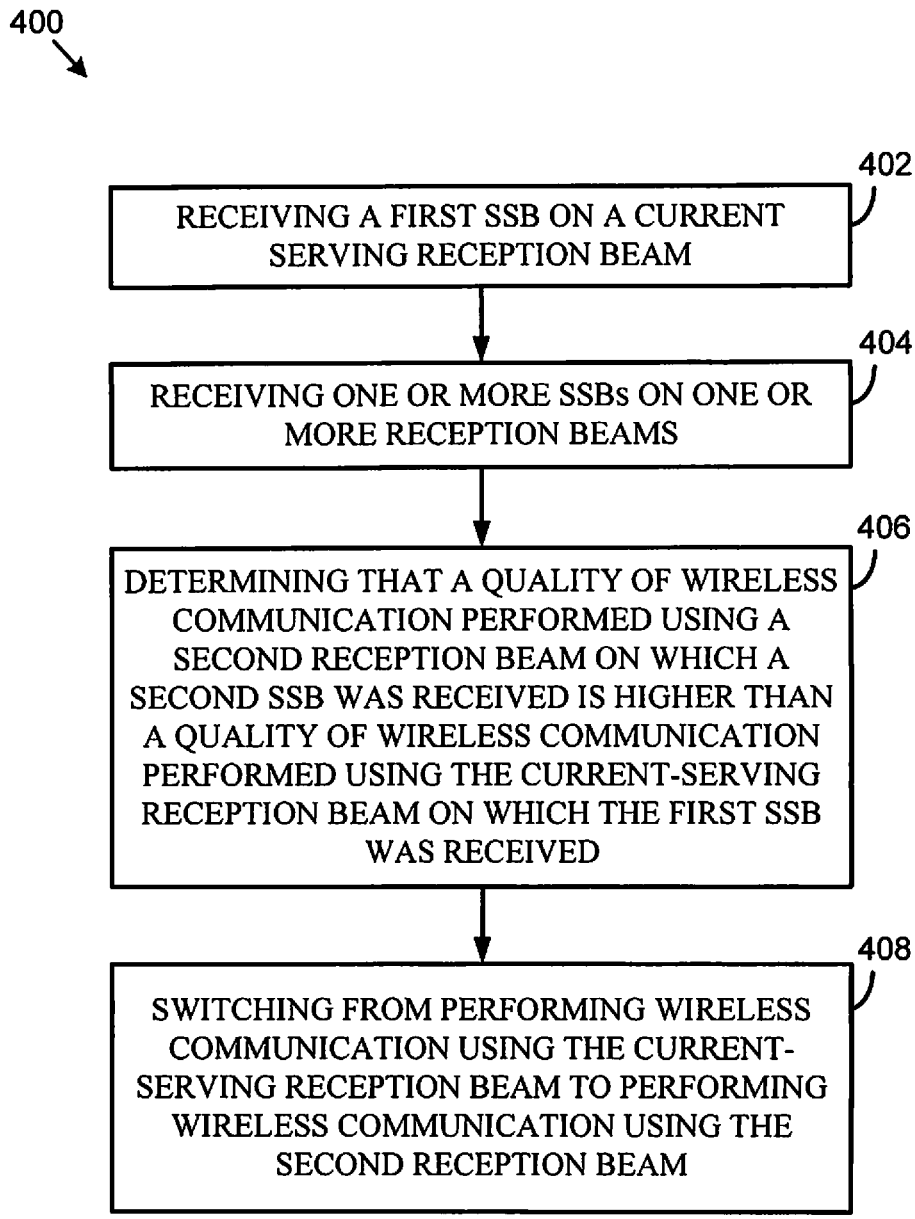
FIG. 4 is a block diagram illustrating a method for performing autonomous beam selection in a wireless communication system according to some aspects of the present disclosure.

FIG. 4 is a block diagram illustrating a method for performing autonomous beam selection in a wireless communication system according to some aspects of the present disclosure. Aspects of method 400 may be implemented with the aspects of this disclosure described with respect to FIGS. 1-3 and 5, such as a mobile device. For example, with reference to FIG. 2, controller/processor 280 of UE 115 may control UE 115 to perform method 400. The example blocks of method 400 will also be described with respect to UE 115 as illustrated in FIG. 5.

Figure 5:
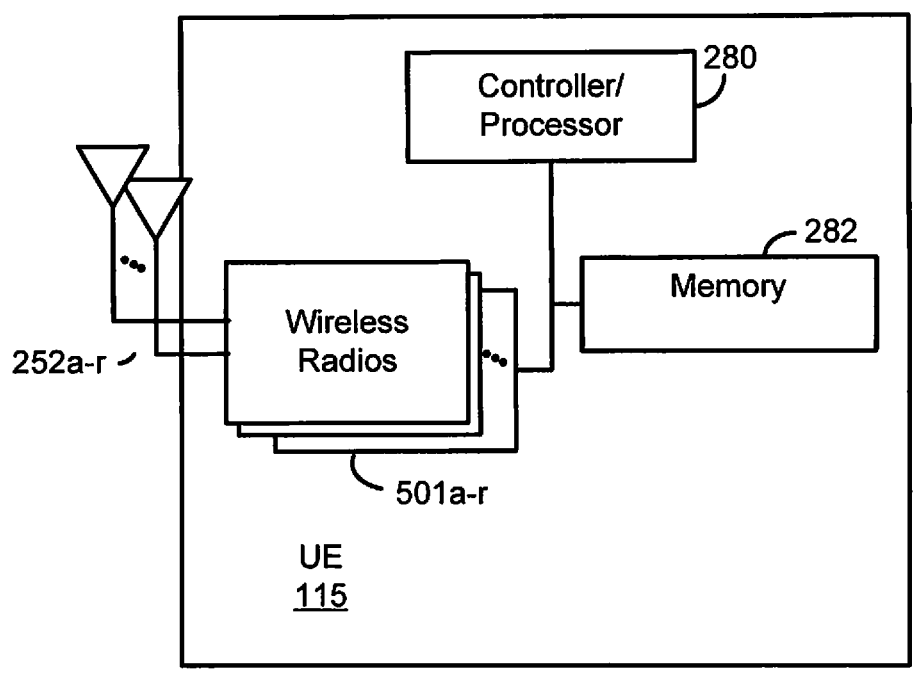
FIG. 5 is a block diagram conceptually illustrating a design of a UE configured according to some aspects of the present disclosure.

FIG. 5 is a block diagram illustrating UE 115 configured according to one aspect of the present disclosure. UE 115 may include various structures, hardware, and components, such as those illustrated for UE 115 of FIG. 2. For example, UE 115 includes controller/processor 280, which operates to execute logic or computer instructions stored in memory 282. The controller/processor 280 can also control components of UE 115 that provide the features and functionality of UE 115. UE 115, under control of controller/processor 280, transmits and receives signals via wireless radios 501a-r and antennas 252a-r. The controller/processor 280 can be provided with digital signals obtained from sampling received analog wireless signals for purposes of controlling communication operations. Wireless radios 501a-r include various components and hardware, as illustrated in FIG. 2 for UE 115, including modulator/demodulators 254a-r, MIMO detector 256, receive processor 258, transmit processor 264, and TX MIMO processor 266.

Method 400 includes, at block 402, receiving, by a UE or processor of the UE, a first SSB on a first beam. As illustrated at block 402, the first beam may be a current-serving reception beam the UE uses for communication operations. The first beam may be a new beam in some scenarios. In some example deployments, a UE 115 may, under control of controller/processor 280, receive a first SSB on a current-serving reception beam. The UE may also receive additional SSBs as SSBs can be received on a variety of reception beams from a variety of transmission beams. With specific reference to FIG. 2, in some aspects of the disclosure, a means for receiving a first SSB on a current-serving reception beam may include the UE 115, and more specifically the components of the UE 115, such as, for example, controller/processor 280 and components of the UE 115 that are controlled/directed by controller/processor 280 to cause the UE 115 to receive a first SSB on a current-serving reception beam.

According to some aspects of the disclosure, a SSB may include a variety of control or data information. In some instances, a mobile device can receive and use this information to establish a communication link (e.g., with a base station or another communication device). For example, a SSB may include a base station identifier identifying the base station that transmitted the SSB. The SSB may also include a beam identifier identifying a beam used by the base station to transmit the SSB. According to some aspects of the disclosure, each received SSB may be associated with a single base station transmission beam. In other scenarios, received SSBs could be associated with other communication devices, such as a variety of base stations. A communication device, such as a UE, may also use one or more SSBs to consider possible beam adjustments or switches.

In some aspects of the disclosure, a current-serving reception beam may refer to one or more beams used at varying times for communication. For example, a current-serving beam can refer to a beam under present use. As shown at block 402, a current-serving reception beam may refer to a mobile device reception beam that was previously identified. In some scenarios, additionally or alternatively, a current-serving reception beam could be a beam used by a mobile device during an initial access procedure (e.g., to establish a current communication link between a mobile device and base station for wireless communication. For example, a current communication link may be established using a previously-identified mobile device reception beam. In this arrangement, a mobile device may continue to use that same mobile device reception beam used to establish a current communication link for continued wireless communication between the mobile device and the base station. In some instances, this may be done so long as the communication link is still in operation (e.g., before a potential or experienced communication link failure). Accordingly, in some aspects of the disclosure, the current-serving reception beam may be a mobile device reception beam that was used, e.g., during an initial access procedure, to establish the current communication link between the mobile device and the base station and that continues to be used for current wireless communication between the mobile device and the base station.

According to some aspects of the disclosure, the current-serving reception beam may have been previously identified. Identification may be based on a number of factors or criteria. For example, identification can be based on processing of a SSB received by a mobile device from a base station, e.g., an SSB received during an initial access procedure. In another aspect of the disclosure, the current-serving reception beam may have been previously identified based on processing of a CSI-RS received by a mobile device from a base station, e.g., a CSI-RS received during an initial access procedure.

In some aspects of the disclosure, receiving a first SSB on a current-serving reception beam, such as at block 402, may refer to subsequent reception of an SSB on the current-serving reception beam. For example, receiving a first SSB on a current-serving reception beam, such as at block 402, may include subsequent reception of an SSB on the current-serving reception beam after the mobile device has already performed an initial access procedure to establish a communication link and identify the current-serving reception beam to be used by the mobile device for wireless communication with a base station.

At block 404, method 400 includes receiving, by the UE or processor of the UE; one or more SSBs on one or more reception beams. In some aspects of the disclosure, each of the one or more SSBs may be received on a different one of the one or more reception beams. Further, use of one or more beams may be dynamic during communication operations or in preparation of communication operations. Beam numbers and beams may change over time during communication operations (e.g., brought about by autonomous beam adjustments and/or switching). As an example of the actions performed at block 404, UE 115 may, under control of controller/processor 280, receive one or more SSBs on one or more reception beams. With specific reference to FIG. 2, in some aspects of the disclosure, a means for receiving one or more SSBs on one or more reception beams may include the UE 115, and more specifically the components of the UE 115, such as, for example, controller/processor 280 and components of the UE 115 that are controlled/directed by controller/processor 280 to cause the UE 115 to receive one or more SSBs on one or more reception beams.

SSBs may be received in a variety of manners for communication purposes. For example, in some aspects of the disclosure, each received SSB, e.g., each SSB of the one or more received SSBs, may be received on a single mobile device reception beam, e.g., a single reception beam of the one or more reception beams. In other words, each received SSB may be associated with a single mobile device reception beam. For example, a first SSB of the one or more received SSBs may be received on a first mobile device reception beam of the one or more reception beams and a second SSB of the one or more received SSBs may be received on a second mobile device reception beam of the one or more reception beams.

SSB reception can occur in numerous time and/or state arrangements. For example, according to some aspects of the disclosure, receiving one or more SSBs on one or more reception beams, such as at block 404, may be performed at a variety of time instances. According to some examples, reception can occur before and/or after a communication link establishment. In some arrangements, a communication link between a mobile device and a base station may already be established, and a current-serving reception beam has been identified by the mobile device for use in performing wireless communication with a base station. In other words, receiving one or more SSBs on one or more reception beams may refer to subsequent reception performed after an initial access procedure to establish a communication link has already been performed. Thus, in some aspects of the disclosure, at the time that the mobile device receives one or more SSBs on one or more reception beams, such as at block 404, the mobile device may already have a current-serving reception beam that is being used for wireless communication.

According to an aspect of the disclosure, receiving one or more SSBs on one or more reception beams, such as at block 404, may include receiving a variety of reception approaches. Indeed, in some arrangements, reception may also include subsequent reception of an SSB on the current-serving reception beam. For example, receiving one or more SSBs on one or more reception beams, such as at block 404, may include subsequent reception of an SSB on the current-serving reception beam after the mobile device has already performed an initial access procedure to establish a communication link and identify the current-serving reception beam to be used by the mobile device for wireless communication with a base station. Therefore, in an aspect of the disclosure, the current-serving reception beam may be part of the one or more reception beams mentioned at block 404 and an SSB received on the current-serving reception beam may be part of the one or more SSBs mentioned at block 404.

SSB selections may be based on a number of parameters. In some cases, selections may be related to parameter thresholds. For example, thresholds may be set at desired levels or states to yield acceptable and/or unacceptable communication quality states or levels. As illustrated at block 406, method 400 includes determining, by the UE or processor of the UE, that a quality of wireless communication performed using a second reception beam on which a second SSB was received is higher than a quality of wireless communication performed using the current-serving reception beam on which the first SSB was received. In some aspects of the disclosure, the second SSB may be one of the one or more SSBs mentioned at block 404 and the second reception beam may be one of the one or more reception beams mentioned at block 404. As an example of the action performed at block 406, UE 115 may, under control of controller/processor 280, determine that a quality of wireless communication performed using a second reception beam on which a second SSB was received is better than a quality of wireless communication performed using the current-serving reception beam on which the first SSB was received. With specific reference to FIG. 2, in some aspects of the disclosure, a means for determining that a quality of wireless communication performed using a second reception beam on which a second SSB was received is better than a quality of wireless communication performed using the current-serving reception beam on which the first SSB was received may include the UE 115, and more specifically the components of the UE 115, such as, for example, controller/processor 280 and components of the UE 115 that are controlled/directed by controller/processor 280 to cause the UE 115 to determine that a quality of wireless communication performed using a second reception beam on which a second SSB was received is better than a quality of wireless communication performed using the current-serving reception beam on which the first SSB was received.

Candidate beams for selection can involve a variety of beams. Beam selection for communications can be a new beam, a previously established beam, or both. In some aspects of the disclosure, the second reception beam on which a second SSB was received, such as at block 406, may be a reception beam that is different than the current-serving reception beam on which the first SSB was received. Similarly, the second SSB may be different than the first SSB.

According to some aspects of the disclosure, the mobile device may determine the quality of wireless communication performed using a certain reception beam by measuring the power of an SSB received on that certain reception beam. In some aspects of the disclosure, the power measurement measured by a mobile device of an SSB received on the certain reception beam may be referred to as a Reference Signal Reference Power (RSRP) measurement of that certain reception beam. For example, the mobile device may determine the quality of wireless communication performed using the current-serving reception beam by measuring the power of an SSB received on the current-serving reception beam. That power measurement may be referred to as the RSRP of that SSB received on the current-serving reception beam. Similarly, the mobile device may determine the quality of wireless communication performed using the second reception beam by measuring the power of an SSB received on the second reception beam. That power measurement may be referred to as the RSRP of that SSB received on the second reception beam. Accordingly, in some aspects of the disclosure, the quality of wireless communication performed using the current-serving reception beam, e.g., as mentioned at block 406, may be indicated by a first RSRP measurement, e.g., a power measurement, of the first SSB performed by the mobile device. Similarly, in some aspects of the disclosure, the quality of wireless communication performed using the second reception beam, e.g., as mentioned at block 406, may be indicated by a second RSRP measurement, e.g., a power measurement, of the second SSB performed by the mobile device. Thus, according to some aspects of the disclosure, determining that the quality of wireless communication performed using the second reception beam is higher than the quality of wireless communication performed using the current-serving reception beam, such as at block 406, may include determining that the second RSRP is higher than the first RSRP by a threshold.

The determination of block 406 may be based on various metrics measured from SSBs. For example, according to some aspects of the disclosure, the determination that the quality of wireless communication performed using the second reception beam is higher than the quality of wireless communication performed using the current-serving reception beam, such as at block 406, may be based on first and second metrics measured from the first and second SSBs, respectively, despite the mobile device receiving an instruction to monitor at least one CSI-RS. In particular, the mobile device may have previously received an instruction to monitor at least one CSI-RS. For example, the mobile device may have received that instruction to monitor at least one CSI-RS as part of an instruction from the base station to the mobile device to perform CSI-RS-based communication link monitoring and/or management. As a result, in some aspects of the disclosure, the mobile device may receive and process at least one CSI-RS to perform communication link monitoring and/or management. In one aspect of the disclosure, the current-serving reception beam may have been previously identified based on processing of a CSI-RS received by a mobile device from a base station.

In some aspects of the disclosure, a UE may determine a better beam based on metrics measured from SSBs despite receiving an instruction to monitor the at least one CSI-RS. For example, in one aspect of the disclosure, despite the received instruction to monitor the at least one CSI-RS, the mobile device may still determine that the quality of wireless communication performed using the second reception beam is better than the quality of wireless communication performed using the current-serving reception beam, such as at block 406, based on first and second metrics measured from the first and second SSBs, respectively. For example, the first metric may be the RSRP measurement measured from the SSB received on the current-serving reception beam and the second metric may be the RSRP measurement measured from the SSB received on the second reception beam. As described at block 406, those SSB-based metrics may be used by the mobile device to determine that the quality of wireless communication performed using the second reception beam is better than the quality of wireless communication performed using the current-serving reception beam.

In some aspects of the disclosure, a UE may determine a better beam based on metrics measured from SSBs despite the base station lacking support for SSB-based communication link management. For example, in one aspect of the disclosure, the determination performed at block 406 may be based on first and second metrics measured from the first and second SSBs, respectively, despite the base station lacking support for performing communication link management based on processing of SSBs or based on processing of information obtained from processing of SSBs. For example, in an aspect of the disclosure, the base station, e.g., the base station that transmits the first SSB received by the mobile device on the current-serving reception beam, such as at block 402, may not support performing communication link monitoring and/or management based on processing of SSBs or based on processing of information obtained from processing of SSBs because the base station is only configured to perform CSI-RS-based communication link monitoring and/or management. Therefore, in some aspects of the disclosure, even though the base station may be configured to transmit SSBs, the base station may not be configured to or be able to perform SSB-based communication link monitoring and/or management.

SSBs may be processed to determine better beams in various scenarios. For example, as mentioned previously, despite a base station lacking support for performing communication link management based on processing of SSBs or based on processing of information obtained from processing of SSBs, the mobile device may still perform the determination action of block 406 based on first and second metrics measured from the first and second SSBs, respectively. As described above, the first metric may be the RSRP measurement measured from the SSB received on the current-serving reception beam and the second metric may be the RSRP measurement measured from the SSB received on the second reception beam. As described at block 406, those SSB-based metrics may be used by the mobile device to determine that the quality of wireless communication performed using the second reception beam is better than the quality of wireless communication performed using the current-serving reception beam.

In some aspects of the disclosure, a mobile device may be configured to perform beam failure detection (BFD) and beam failure recovery (BFR) procedures. For example, a mobile device may perform a BFD process to detect a failure in wireless communication performed using the current-serving reception beam and may initiate or perform a BFR process to identify another beam through which the mobile device may continue wireless communication, thereby recovering from the detected failure in wireless communication performed using the current-serving reception beam. Similarly, a base station may be configured to assist a mobile device in recovering from a failure in wireless communication performed using the current-serving reception beam, e.g., by informing the mobile device of one or more other beams that the mobile device can use for reliable communication when a failure in wireless communication performed using the current-serving reception beam has been detected by the mobile device.

Beam quality determination may occur in numerous approaches. According to some aspects of the disclosure, the determination that the quality of wireless communication performed using the second reception beam is higher than the quality of wireless communication performed using the current-serving reception beam, such as at block 406, may be made before a beam failure recovery procedure is initiated for the current-serving reception beam. For example, in one aspect of the disclosure, that determination, such as at block 406, may be made before the mobile device detects a failure in wireless communication performed using the current-serving reception beam using a BFD process. Accordingly, that determination, such as at block 406, may also be made before a BFR procedure is initiated for the current-serving reception beam. In some aspects of the disclosure, that determination, such as at block 406, may be made while the communication link is still in operation, e.g., before a communication link failure is indicated.

Beam adjustments or switching may be deployed in a variety of approaches. Generally, adjustments or switches may be partially and/or wholly based on beam quality determinations. As one example, at block 408, method 400 includes switching, by the UE or processor of the UE, from performing wireless communication using the current-serving reception beam to performing wireless communication using the second reception beam. Such a switch can be based on or made upon determining that the quality of wireless communication performed using the second reception beam is higher than the quality of wireless communication performed using the current-serving reception beam. As an example, UE 115 may, under control of controller/processor 280, switch from performing wireless communication using the current-serving reception beam to performing wireless communication using the second reception beam upon determining that the quality of wireless communication performed using the second reception beam is better than the quality of wireless communication performed using the current-serving reception beam.

With specific reference to FIG. 2, in some aspects of the disclosure, a means for switching from performing wireless communication using the current-serving reception beam to performing wireless communication using the second reception beam upon determining that the quality of wireless communication performed using the second reception beam is better than the quality of wireless communication performed using the current-serving reception beam may include the UE 115, and more specifically the components of the UE 115, such as, for example, controller/processor 280 and components of the UE 115 that are controlled/directed by controller/processor 280 to cause the UE 115 to switch from performing wireless communication using the current-serving reception beam to performing wireless communication using the second reception beam upon determining that the quality of wireless communication performed using the second reception beam is better than the quality of wireless communication performed using the current-serving reception beam.

A UE may determine which of the second reception beam or the current-serving reception beam is better based on their associated RSRP metrics. For example, in some aspects of the disclosure, the mobile device may determine that the quality of wireless communication performed using the second reception beam is better than the quality of wireless communication performed using the current-serving reception beam, such as at block 406, by determining that the second RSRP is higher than the first RSRP by a threshold. Based on such a determination, the mobile device may switch from performing wireless communication using the current-serving reception beam to performing wireless communication using the second reception beam. In particular, as previously described, the current-serving reception beam may refer to a mobile device reception beam that was used, e.g., during an initial access procedure, to establish the current communication link between the mobile device and the base station and that continues to be used for current wireless communication between the mobile device and the base station. However, upon determining that the quality of wireless communication performed using the second reception beam is better than the quality of wireless communication performed using the current-serving reception beam, the mobile device may begin, or initiate the process to begin, to use the second reception beam for wireless communication. As a result, the second reception beam may become the current-serving reception beam of the mobile device for subsequent wireless communication performed by the mobile device with the base station. The beam that was originally used as the current-serving reception beam may no longer be used for wireless communication or at least until another switch is performed by the mobile device.

A beam switch may be based on metrics measured from SSBs. For example, in some aspects of the disclosure, a beam switch, such as the beam switch described at block 408, may be based on first and second metrics measured from the first and second SSBs, respectively, despite the mobile device receiving an instruction to monitor at least one CSI-RS. In particular, in some aspects of the disclosure, despite the mobile device receiving an instruction to monitor at least one CSI-RS, the mobile device may still switch from performing wireless communication using the current-serving reception beam to performing wireless communication using the second reception beam, such as at block 408, based on first and second metrics measured from the first and second SSBs, respectively. As previously described with respect to the determination action of block 406, the first metric may be the RSRP measurement measured from the SSB received on the current-serving reception beam and the second metric may be the RSRP measurement measured from the SSB received on the second reception beam.

SSBs may be processed in various scenarios to determine whether to perform a beam switch. For example, in other aspects of the disclosure, a beam switch, such as the beam switch described at block 408, may be based on first and second metrics measured from the first and second SSBs, respectively, despite the base station lacking support for performing communication link management based on processing of SSBs or based on processing of information obtained from processing of SSBs. In particular, in some aspects of the disclosure, despite the base station lacking support for performing communication link management based on processing of SSBs or based on processing of information obtained from processing of SSBs, the mobile device may still switch from performing wireless communication using the current-serving reception beam to performing wireless communication using the second reception beam, such as at block 408, based on first and second metrics measured from the first and second SSBs, respectively. For example, as described above, the first metric may be the RSRP measurement measured from the SSB received on the current-serving reception beam and the second metric may be the RSRP measurement measured from the SSB received on the second reception beam.

In some aspects of the disclosure, switching from performing wireless communication using the current-serving reception beam to performing wireless communication using the second reception beam, such as at block 408, may occur before a beam failure recovery procedure is initiated for the current-serving reception beam. For example, in one aspect of the disclosure, the switch, such as at block 408, may occur before the mobile device detects a failure in wireless communication performed using the current-serving reception beam using a BFD process. Accordingly, that switch, such as at block 408, may also occur before a BFR procedure is initiated for the current-serving reception beam. In some aspects of the disclosure, that switch, such as at block 408, may occur while the communication link is still in operation, e.g., before a communication link failure is indicated.

A UE may transmit information using a transmission beam with the same directivity pattern as the second reception beam after switching to the second reception beam. For example, according to some aspects of the disclosure, after switching from performing wireless communication using the current-serving reception beam to performing wireless communication using the second reception beam, the mobile device may transmit information using a contention-based random access channel (RACH) process and a transmission beam with the same directivity pattern as the second reception beam. In particular, the mobile device may perform contention-based RACH communication with a base station using a transmission beam with the same directivity pattern as the second reception beam after switching from performing wireless communication using the current-serving reception beam to performing wireless communication using the second reception beam. In some aspects of the disclosure, the mobile device may transmit information to the base station using a contention-based RACH process and a transmission beam with the same directivity pattern as the second reception beam, or a transmission beam having a directivity pattern determined or selected based on the directivity pattern of the second reception beam, to inform the base station of the SSB and associated second reception beam that the mobile device is now using for wireless communication. According to some aspects of the disclosure, the base station may account for the fact that the mobile device is now using the specified SSB and associated second reception beam in subsequent wireless communication that the base station performs with the mobile device.

In some aspects of the disclosure, a transmission beam with the same directivity pattern as the second reception beam may be referred to as a reciprocal transmission beam to the second reception beam. Thus, the transmission beam used by the mobile device to transmit information to a base station using the contention-based RACH process after the mobile device has switched from performing wireless communication using the current-serving reception beam to performing wireless communication using the second reception beam may be referred to as a reciprocal transmission beam of the second reception beam.

In other aspects of the disclosure, the transmission beam used by the mobile device to transmit information to a base station using the contention-based RACH process may not have the same directivity pattern as the second reception beam. Instead, the directivity pattern of the transmission beam used to transmit information using the contention-based RACH process may be determined based on the directivity pattern of the second reception beam. For example, in one aspect of the disclosure, the directivity pattern of the transmission beam used to transmit information using the contention-based RACH process may be determined to be within a certain degree of the directivity pattern of the second reception beam or selected because it is within a certain degree of the directivity pattern of the second reception beam.

In some aspects, UE autonomous beam selection may include a UE receiving a first SSB on a current-serving reception beam and receiving one or more SSBs on one or more reception beams. The one or more SSBs may be received on different ones of the one or more reception beams. UE autonomous beam selection may also include the UE determining that a quality of wireless communication performed using a second reception beam on which a second SSB was received is higher than a quality of wireless communication performed using the current-serving reception beam on which the first SSB was received. The second SSB may be one of the one or more SSBs. UE autonomous beam selection may further include the UE switching from performing wireless communication using the current-serving reception beam to performing wireless communication using the second reception beam. Such a switch can be based on or made upon determining that the quality of wireless communication performed using the second reception beam is higher than the quality of wireless communication performed using the current-serving reception beam.

UE autonomous beam selection may include additional aspects, such as any single aspect or any combination of aspects described below and/or in connection with one or more other processes described elsewhere herein.

In a first aspect, the quality of wireless communication performed using the current-serving reception beam may be indicated by a first RSRP measurement of the first SSB.

In a second aspect, alone or in combination with the first aspect, the quality of wireless communication performed using the second reception beam may be indicated by a second RSRP measurement of the second SSB.

In a third aspect, alone or in combination with one or more of the first and second aspects, the UE determining that the quality of wireless communication performed using the second reception beam is higher than the quality of wireless communication performed using the current-serving reception beam may include the UE determining that the second RSRP is higher than the first RSRP by a threshold.

In a fourth aspect, alone or in combination with one or more of the first through third aspects, the UE may receive an instruction to monitor at least one CSI-RS.

In a fifth aspect, alone or in combination with one or more of the first through fourth aspects, the determination that the quality of wireless communication performed using the second reception beam is higher than the quality of wireless communication performed using the current-serving reception beam may be based on first and second metrics measured from the first and second SSBs, respectively, despite the instruction to monitor the at least one CSI-RS.

In a sixth aspect, alone or in combination with one or more of the first through fifth aspects, the UE may transmit information using a contention-based random access channel (RACH) process after switching from performing wireless communication using the current-serving reception beam to performing wireless communication using the second reception beam.

In a seventh aspect, alone or in combination with one or more of the first through sixth aspects, the UE may transmit information using a transmission beam with the same directivity pattern as the second reception beam after switching from performing wireless communication using the current-serving reception beam to performing wireless communication using the second reception beam.

In an eighth aspect, alone or in combination with one or more of the first through seventh aspects, the determination that the quality of wireless communication performed using the second reception beam is higher than the quality of wireless communication performed using the current-serving reception beam may be made before a beam failure recovery procedure is initiated for the current-serving reception beam.

In a ninth aspect, alone or in combination with one or more of the first through eighth aspects, a UE may receive a first SSB on a first reception beam and a second SSB on a second reception beam.

In a tenth aspect, alone or in combination with one or more of the first through ninth aspects, either the first reception beam or the second reception beam may be configured for wireless communication as a current-serving reception beam.

In an eleventh aspect, alone or in combination with one or more of the first through tenth aspects, a UE may switch the current-serving reception beam to another of the first reception beam or the second reception beam based on one or more threshold parameters associated with the first and second reception beam.

In twelfth aspect, alone or in combination with one or more of the first through eleventh aspects, a UE may define the one or more threshold parameters based on reference signal power measurements or channel state information associated with the first reception beam and the second reception beam.

In a thirteenth aspect, alone or in combination with one or more of the first through twelfth aspects, a UE may determine that either the first reception beam or the second reception beam should be the current-serving reception beam based on parameters associated with the first SSB and second SSB.

In a fourteenth aspect, alone or in combination with one or more of the first through thirteenth aspects, a wireless communication device may include a communication interface configured to receive a first SSB on a first reception beam and a second SSB on a second reception beam.

In a fifteenth aspect, alone or in combination with one or more of the first through fourteenth aspects, either the first reception beam or the second reception beam is configured for wireless communication as a current-serving reception beam.

In a sixteenth aspect, alone or in combination with one or more of the first through fifteenth aspects, a wireless communication device may include a processor configured to switch the current-serving reception beam to another of the first reception beam or the second reception beam based on one or more threshold parameters associated with the first and second reception beam.

In a seventeenth aspect, alone or in combination with one or more of the first through sixteenth aspects, the processor of the wireless communication device may be further configured to define the one or more threshold parameters based on reference signal power measurements or channel state information associated with the first reception beam and the second reception beam.

In a eighteenth aspect, alone or in combination with one or more of the first through seventeenth aspects, the communication interface of the wireless communication device may be further configured to receive switching instructions from the processor and in response switch the current reception beam to another of the first reception beam or the second reception beam.

In a nineteenth aspect, alone or in combination with one or more of the first through eighteenth aspects, the processor of the wireless communication device may be further configured to determine that either the first reception beam or the second reception beam should be the current-serving reception beam based on parameters associated with the first SSB and second SSB.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof.

Those of skill would further appreciate that the various illustrative logical blocks, modules, circuits, and algorithm processing (e.g., the logical blocks in FIG. 4) described in connection with the disclosure herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Features of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, by a user equipment (UE), an instruction to monitor at least one channel state information reference signal (CSI-RS);
identifying, by the UE, a current-serving reception beam based, at least in part, on the at least one CSI-RS;
receiving, by the UE, a first synchronization signal block (SSB) on the current-serving reception beam;
receiving, by the UE, one or more SSBs on one or more reception beams, wherein the one or more SSBs are received on different ones of the one or more reception beams;
determining, by the UE, that a quality of wireless communication performed using a second reception beam on which a second SSB was received is higher than a quality of wireless communication performed using the CSI-RS-identified current-serving reception beam on which the first SSB was received based on first and second metrics measured from the first and second SSBs, respectively, despite the instruction to monitor the at least one CSI-RS, wherein the second SSB is one of the one or more SSBs; and
switching, by the UE, from performing wireless communication using the current-serving reception beam to performing wireless communication using the second reception beam based on the SSB-based determination that the quality of wireless communication performed using the second reception beam is higher than the quality of wireless communication performed using the CSI-RS-identified current-serving reception beam.

2. The method of claim 1, wherein the quality of wireless communication performed using the current-serving reception beam is indicated by a first reference signal reference power (RSRP) measurement of the first SSB and the quality of wireless communication performed using the second reception beam is indicated by a second RSRP measurement of the second SSB, and wherein determining that the quality of wireless communication performed using the second reception beam is higher than the quality of wireless communication performed using the current-serving reception beam comprises determining that the second RSRP is higher than the first RSRP by a threshold.

3. The method of claim 1, further comprising:
transmitting information using a contention-based random access channel (RACH) process and a transmission beam with the same directivity pattern as the second reception beam after switching from performing wireless communication using the current-serving reception beam to performing wireless communication using the second reception beam.

4. The method of claim 1, wherein the determination that the quality of wireless communication performed using the second reception beam is higher than the quality of wireless communication performed using the current-serving reception beam is made before a beam failure recovery procedure is initiated for the current-serving reception beam.

5. An apparatus configured for wireless communication, comprising:
means for receiving an instruction to monitor at least one channel state information reference signal (CSI-RS);
means for identifying a current-serving reception beam based, at least in part, on the at least one CSI-RS;
means for receiving a first synchronization signal block (SSB) on the current-serving reception beam;
means for receiving one or more SSBs on one or more reception beams, wherein the one or more SSBs are received on different ones of the one or more reception beams;
means for determining that a quality of wireless communication performed using a second reception beam on which a second SSB was received is higher than a quality of wireless communication performed using the CSI-RS-identified current-serving reception beam on which the first SSB was received based on first and second metrics measured from the first and second SSBs, respectively, despite the instruction to monitor the at least one CSI-RS, wherein the second SSB is one of the one or more SSBs; and means for switching from performing wireless communication using the current-serving reception beam to performing wireless communication using the second reception beam based on the SSB-based determination that the quality of wireless communication performed using the second reception beam is higher than the quality of wireless communication performed using the CSI-RS-identified current-serving reception beam.

6. The apparatus of claim 5, wherein the quality of wireless communication performed using the current-serving reception beam is indicated by a first reference signal reference power (RSRP) measurement of the first SSB and the quality of wireless communication performed using the second reception beam is indicated by a second RSRP measurement of the second SSB, and wherein the means for determining that the quality of wireless communication performed using the second reception beam is higher than the quality of wireless communication performed using the current-serving reception beam comprises means for determining that the second RSRP is higher than the first RSRP by a threshold.

7. The apparatus of claim 5, further comprising:
means for transmitting information using a contention-based random access channel (RACH) process and a transmission beam with the same directivity pattern as the second reception beam after switching from performing wireless communication using the current-serving reception beam to performing wireless communication using the second reception beam.

8. The apparatus of claim 5, further comprising means for determining that the quality of wireless communication performed using the second reception beam is higher than the quality of wireless communication performed using the current-serving reception beam before a beam failure recovery procedure is initiated for the current-serving reception beam.

9. A non-transitory computer-readable medium having program code recorded thereon, the program code comprising:
program code executable by a computer for causing the computer to receive an instruction to monitor at least one channel state information reference signal (CSI-RS);
program code executable by the computer for causing the computer to identify a current-serving reception beam based, at least in part, on the at least one CSI-RS;
program code executable by the computer for causing the computer to receive a first synchronization signal block (SSB) on the current-serving reception beam;
program code executable by the computer for causing the computer to receive one or more SSBs on one or more reception beams, wherein the one or more SSBs are received on different ones of the one or more reception beams;
program code executable by the computer for causing the computer to determine that a quality of wireless communication performed using a second reception beam on which a second SSB was received is higher than a quality of wireless communication performed using the CSI-RS-identified current-serving reception beam on which the first SSB was received based on first and second metrics measured from the first and second SSBs, respectively, despite the instruction to monitor the at least one CSI-RS, wherein the second SSB is one of the one or more SSBs; and program code executable by the computer for causing the computer to switch from performing wireless communication using the current-serving reception beam to performing wireless communication using the second reception beam based on the SSB-based determination that the quality of wireless communication performed using the second reception beam is higher than the quality of wireless communication performed using the CSI-RS-identified current-serving reception beam.

10. The non-transitory computer-readable medium of claim 9, wherein the quality of wireless communication performed using the current-serving reception beam is indicated by a first reference signal reference power (RSRP) measurement of the first SSB and the quality of wireless communication performed using the second reception beam is indicated by a second RSRP measurement of the second SSB, and wherein the program code executable by the computer for causing the computer to determine that the quality of wireless communication performed using the second reception beam is higher than the quality of wireless communication performed using the current-serving reception beam comprises program code executable by the computer for causing the computer to determine that the second RSRP is higher than the first RSRP by a threshold.

11. The non-transitory computer-readable medium of claim 9, further comprising:
program code executable by the computer for causing the computer to transmit information using a contention-based random access channel (RACH) process and a transmission beam with the same directivity pattern as the second reception beam after switching from performing wireless communication using the current-serving reception beam to performing wireless communication using the second reception beam.

12. The non-transitory computer-readable medium of claim 9, further comprising program code executable by the computer for causing the computer to determine that the quality of wireless communication performed using the second reception beam is higher than the quality of wireless communication performed using the current-serving reception beam before a beam failure recovery procedure is initiated for the current-serving reception beam.

13. An apparatus configured for wireless communication, the apparatus comprising:
at least one processor; and
a memory coupled to the at least one processor,
wherein the at least one processor is configured to:
receive an instruction to monitor at least one channel state information reference signal (CSI-RS);
identify a current-serving reception beam based, at least in part, on the at least one CSI-RS;
receive a first synchronization signal block (SSB) on the current-serving reception beam;
receive one or more SSBs on one or more reception beams, wherein the one or more SSBs are received on different ones of the one or more reception beams;
determine that a quality of wireless communication performed using a second reception beam on which a second SSB was received is higher than a quality of wireless communication performed using the CSI-RS-identified current-serving reception beam on which the first SSB was received based on first and second metrics measured from the first and second SSBs, respectively, despite the instruction to monitor the at least one CSI-RS, wherein the second SSB is one of the one or more SSBs; and switch from performing wireless communication using the current-serving reception beam to performing wireless communication using the second reception beam based on the SSB-based determination that the quality of wireless communication performed using the second reception beam is higher than the quality of wireless communication performed using the CSI-RS-identified current-serving reception beam.

14. The apparatus of claim 13, wherein the quality of wireless communication performed using the current-serving reception beam is indicated by a first reference signal reference power (RSRP) measurement of the first SSB and the quality of wireless communication performed using the second reception beam is indicated by a second RSRP measurement of the second SSB, and wherein the at least one processor being configured to determine that the quality of wireless communication performed using the second reception beam is higher than the quality of wireless communication performed using the current-serving reception beam comprises the at least one processor being configured to determine that the second RSRP is higher than the first RSRP by a threshold.

15. The apparatus of claim 13, wherein the at least one processor is further configured to transmit information using a contention-based random access channel (RACH) process and a transmission beam with the same directivity pattern as the second reception beam after switching from performing wireless communication using the current-serving reception beam to performing wireless communication using the second reception beam.

16. The apparatus of claim 13, wherein the at least one processor is further configured to determine that the quality of wireless communication performed using the second reception beam is higher than the quality of wireless communication performed using the current-serving reception beam before a beam failure recovery procedure is initiated for the current-serving reception beam.

* * * * *